United States Patent [19]

Phillips

[11] Patent Number: 5,271,032
[45] Date of Patent: Dec. 14, 1993

[54] LID HEATER FOR GLASS MELTER

[76] Inventor: Terrance D. Phillips, 617 Chestnut Ct., Aiken, S.C. 29803

[21] Appl. No.: 820,463

[22] Filed: Jan. 14, 1992

[51] Int. Cl.$^5$ ............................................. C03B 18/18
[52] U.S. Cl. .................................. 373/27; 373/29; 373/30; 373/32; 373/37; 373/117; 373/127; 373/131; 65/356; 65/347
[58] Field of Search ........... 373/27, 28, 29, 30, 373/32, 34, 36, 37, 38, 39, 41, 117, 127, 131, 128, 134, 109, 132–134; 65/326, 346, 347, 350, 355, 356

[56] References Cited

U.S. PATENT DOCUMENTS

| | | | |
|---|---|---|---|
| 2,635,388 | 4/1953 | Peyches et al. | 373/27 |
| 2,767,235 | 10/1956 | Herrold et al. | 373/27 |
| 2,798,892 | 7/1957 | Penberthy | 373/27 |
| 2,843,644 | 7/1958 | Hann | 13/6 |
| 2,859,261 | 11/1958 | Arbeit | 373/27 |
| 3,375,314 | 3/1968 | Sinner | 13/6 |
| 3,518,351 | 6/1970 | Ohnsorg et al. | 13/25 |
| 3,576,385 | 4/1971 | Robinson | 13/6 |
| 4,272,639 | 6/1981 | Beck | 373/131 |
| 4,287,380 | 9/1981 | Fairbanks et al. | 13/6 |
| 4,417,097 | 11/1983 | Das | 174/110 |
| 4,421,538 | 12/1983 | Demaschquie | 65/1 |
| 4,483,008 | 11/1984 | Varrasso | 373/27 |
| 4,514,851 | 4/1985 | Dunn | 373/27 |
| 4,627,069 | 12/1986 | Harvey et al. | 373/29 |
| 4,754,124 | 6/1988 | Howell et al. | 219/523 |
| 4,803,698 | 2/1989 | Stephens | 373/27 |
| 4,819,247 | 4/1989 | Seng et al. | 373/30 |
| 4,965,812 | 10/1990 | Sorg et al. | 373/36 |

*Primary Examiner*—Bruce A. Reynolds
*Assistant Examiner*—Tu Hoang
*Attorney, Agent, or Firm*—Brian R. Tumm; Harold H. Dixon; William R. Moser

[57] ABSTRACT

A glass melter having a lid electrode for heating the glass melt radiantly. The electrode comprises a series of INCONEL 690 tubes running above the melt across the melter interior and through the melter walls and having nickel cores inside the tubes beginning where the tubes leave the melter interior and nickel connectors to connect the tubes electrically in series. An applied voltage causes the tubes to generate heat of electrical resistance for melting frit injected onto the melt. The cores limit heat generated as the current passes through the walls of the melter. Nickel bus connection to the electrical power supply minimizes heat transfer away from the melter that would occur if standard copper or water-cooled copper connections were used between the supply and the INCONEL 690 heating tubes.

16 Claims, 1 Drawing Sheet

LID HEATER FOR GLASS MELTER

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to glass melters. In particular, the present invention relates to electrodes for heating the space above the melt in a glass melter.

2. Discussion of Background

A glass melter is a refractory vessel into which glass frit is fed and heated by electrodes until it melts. The molten glass is called a melt. The top of the melt, called a cap, being on the periphery of the melt where the temperature is lower than the center of the melt and where the newly-introduced, unmelted frit joins the molten glass, forms a crust. The cap can insulate the newly added frit from the hot center of the melt and affects the temperature distribution of the melt and, hence, broadens the range of characteristics of the glass produced thereby. Primary electrodes are submerged in the molten glass. The glass is heated as the glass conducts current between the electrodes. Additional electrodes are sometimes also placed in the zone above the melt, the "vapor space" or "plenum", to heat the cap. These electrodes are called lid heaters.

Electrodes of various designs are used in connection with melters. Many have cores made of one material surrounded by sheaths of a second material. Nickel and nickel alloys, because of good conductivity and corrosion resistance, are frequently used. One nickel alloy sold under the trademark INCONEL 690, is described as useful for electrodes in U.S. Pat. No. 4,627,069 issued to Harvey, et al. They state that INCONEL 690 is a useful material for electrodes in melters because it is highly resistive to corrosion and heat, and highly conductive electrically.

Sometimes several electrodes are connected electrically, such as is described by Ohnsorg, et al., in U.S. Pat. No. 3,518,351. Ohnsorg, et al connect hollow electrodes electrically in parallel for use in a glass melter. Plugs are used in the ends of these tubular heaters to avoid the "chimney" affect. The material that connects the electrodes together is selected to have a lower resistivity than the electrode tube material.

For high quality glass and for efficient glass melting, however, it is necessary to heat the plenum with lid electrodes so that cap formation is minimized. There remains a need for efficient, long-lasting electrodes for this purpose.

SUMMARY OF THE INVENTION

According to its major aspects and broadly stated, the present invention is a lid heater for a melter such as glass melter. The melter has a containment with a thick wall. Electrodes are immersed in the molten glass and are used to maintain the pool of molten glass at a constant temperature. Above the melt are a plurality of tubes that run across the interior of the melter and through the walls. Above the melt, but interior to the containment, the tubes are hollow; elsewhere, in the containment wall, the tubes have a core. The material of the tube has a higher electrical resistivity than the material of the core; and the core material, a higher thermal conductivity than that of the tube material. Materials such as INCONEL 690 for the tube and nickel for the core are preferred. The tubes are connected in series electrically by connectors, that are preferably made of nickel.

When an electrical potential is applied to the tubes, they produce heat which, in the containment interior, radiates down to the melt; in the walls, less heat is produced because the core material, being of lower electrical resistivity, conducts the current while generating less power per square inch than would be generated if the same current were conducted through the tube without a core.

An important feature of the present invention is the use of cores with the tubes only when the tubes are not running through the interior of the melter. This arrangement assures that the bulk of the heat is generated in the area above the melt and is not in the area passing though the walls or in the areas exterior to the melter which connect the heater sections.

Another feature of the present invention is the use of nickel for the bus instead of other, more commonly-used metals such as copper, to connect the supply current to the lid heater system. Because nickel has one fourth of the thermal conductivity of copper, less heat energy is lost at the connection to the power supply.

Also use of thermally insulated enclosures surrounding the nickel bus connections outside of the melter will minimize heat loss due to thermal conductivity.

Another feature of the present invention is the choice of tube and core materials. Using INCONEL 690 and nickel give a combination that results in efficient heating in the containment interior, where it is needed, and efficient conductivity for the required current where heating is not desirable, namely, away from the containment interior. Furthermore, these materials are compatible with each other because INCONEL 690 has about a 50% nickel content. They have similar thermal expansion coefficients, melting temperatures (1452° C. for nickel and 1343°–1377° C. for INCONEL 690) and are easy to weld together. Furthermore, INCONEL 690 tube protects the nickel core material from extremely corrosive characteristics of molten glass and glass vapor.

Another important feature of the present invention is the arrangement of the lid electrodes. Several segments are arranged in parallel physically (but in series electrically) in such a way that individual segments can be removed and replaced as needed. The design permits assembly of the heaters with no connections, such as weldments, within the melter where they would be exposed to the corrosive glass environment existing in the melter.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
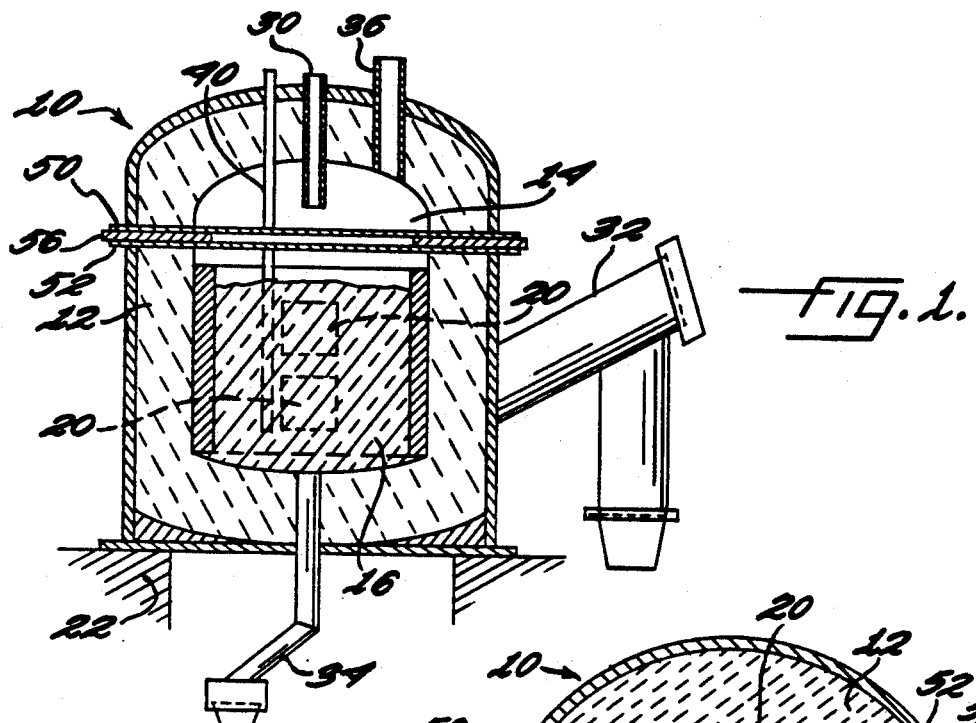
FIG. 1 is a side, cross-sectional elevation of a glass melter according to a preferred embodiment of the present invention.

Referring now to FIG. 1, there is illustrated a side elevation of a glass melter 10 in cross section. Melter 10 has a thick wall 12 that defines an interior 14 and serves as a containment and insulator for a glass melt 16 in the interior. Wall 12 is assembled from a refractory material that resists the effects of the molten glass. Melter 10 rests on a foundation 22 and is connected to several penetrations through wall 12. There is a nozzle 30 for adding glass frit in the form of a slurry; there is a spout 32 for drawing off molten glass; and there is a drain 34 for draining glass. A pipe 36 at the top of melter 10 serves as an off-gas stack.

A plurality of primary electrodes 20, usually four: two near the top of the melt and two toward the bottom of the melt, are immersed in melt 16. The INCONEL 690 electrodes 20 are assembled in pairs. Electrical current (I) is caused to be conducted through the molten glass between electrode pairs; the electrical resistance (R) of the glass and the current result in heat according to the Joule effect ($I^2R$ = power dissipated into the glass as heat). Provision is also made for instrumentation to monitor the temperature and other characteristics of melt 16 such as electrical conductivity and temperature through thermo well 40.

Above melt 16, in the plenum area, is a second electrode 50 for heating the plenum space. Second electrode 50 runs horizontally across the containment interior 14 and completely through wall 12.

Figure 2:
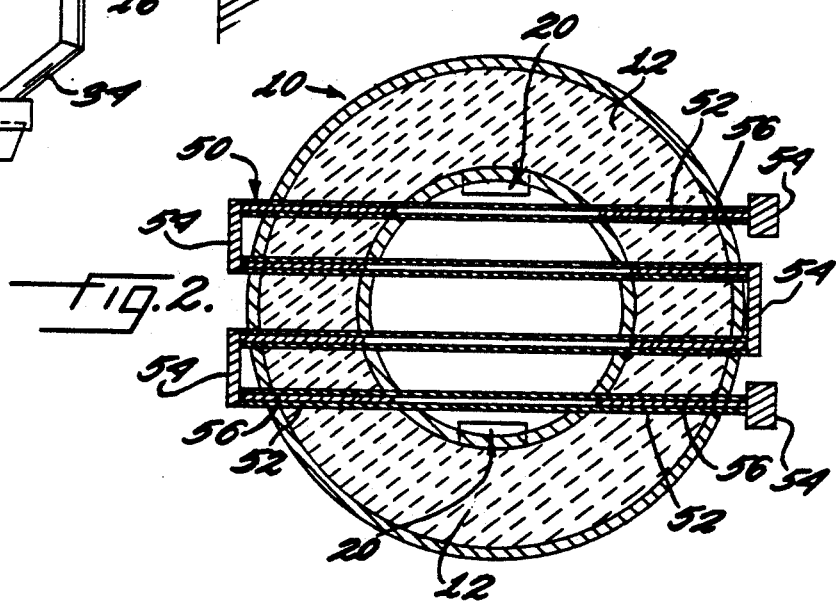
FIG. 2 is a top view of the glass melter of FIG. 1 showing the lid electrode according to a preferred embodiment of the present invention.

In FIG. 2 second electrode 50 is shown in a top view. Electrode 50 comprises a series of parallel tubes 52 joined in series outside wall 12 by a plurality of series connectors 54. When in interior 14, the hollow space within tubes 52 remains hollow. Once away from interior 14, beginning when inside wall 12, tubes 52 carry a core 56 dimensioned to fit tightly within tubes 52.

The material of tubes 52 is selected to have relatively higher electrical resistivity and lower thermal conductivity than the material of which cores 56 are made. Preferably the differences in resistivity and conductivity are relatively large. Materials such as INCONEL 690 for tubes 52 and nickel for the core material are preferred. INCONEL 690 has a resistivity of 51.0 $\mu$ohms/inch; nickel, 3.1 $\mu$ohms/inch. The thermal conductivity of nickel is, however, four times that of INCONEL 690.

It is desirable to have a relatively high resistivity in the tube material for heat generation since the majority of the energy absorbed by the newly added unmelted material (frit plus waste water) is in the form of radiant energy from second electrode 50. The heat it radiates will be readily absorbed by the black cap of melt 16. However, since this heat will also be generated by second electrode 50 when in wall 12 and outside glass melter 10, having a highly electrically conductive core 56 carries the current through the core 56 so that the tubes 52 will not generate heat that would otherwise be transferred to wall 12 of melter 10. Once picked up by cores 56, the current will travel to the next portion of tube 52 that is inside melter 10. Without the nickel core, wall 12 of melter 10 will have considerably more heat to dissipate. INCONEL 690 will require the capability to dissipate ten times more heat than nickel.

The nickel cores lower power consumption because the resistivity of nickel is one-seventeenth the resistivity of INCONEL 690. Furthermore, INCONEL 690 tubes in the walls act as a corrosion barrier. Preferably, the tubing for tubes 52 is two inch, schedule 40 type. The power capacity of the lid heater is in direct proportion to the total length of the heated tubes. Larger melters would use (and require) longer and higher powered heaters. The example described herein generates about 60 Kw of power.

The portions of second electrode 50 are electrically in series. Although INCONEL 690 has a higher electrical resistivity than nickel, its resistivity is not high compared to other materials. Therefore, the heat needed is preferably produced by a series connection rather than a parallel connection. If these four heated elements 52 were to be wired in electrically in parallel instead of in series, the current supplied by the power supply would have to be four times greater in order to generate the required 60 Kw of power. Furthermore, a series connection avoids problems of multiple phases and induction heating associated with electrically parallel systems. The series hookup provides phase cancellation by maintaining the AC hot and neutral lines in close parallel proximity.

Figure 3:
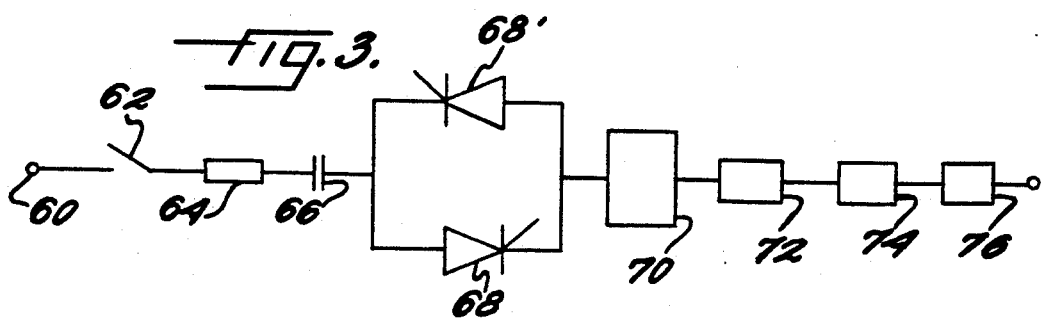
FIG. 3 is a schematic view of a lid electrode according to a preferred embodiment of the present invention.

FIG. 3 illustrates the circuitry schematically. Voltage from a source of electrical potential 80, is applied at 60 and passes a switch 62 when closed to start the heating. Seventeen volts single phase is approximately enough electrical potential to achieve good heating using the materials and sizes described above. A 150 amp fuse 64 and a control contactor 66 follow switch 62 to shut-down the system in the event excessive current is detected. Two thyristers 68 and 68' are fired by phase angle control to control input power via an electronic power controller (not shown). A transformer 70 follows to step the voltage down from the input voltage. Typically a 480 volt-to-17 volt transformer will be appropriate. Second electrode 50 can have about 4 feet of nickel core 72, with a cross sectional area of 1.5 square inches, resulting in a resistance of 192 $\mu$ohms and a heat generation of three Kw, nickel connectors 74 with a resistance of 148 $\mu$ohms generating 2.6 Kw of heat, and the INCONEL 690 tubes 76 having a resistance of 3988 $\mu$ohms generating 60 Kw of heat. The application of the full 17 VAC will result in the conduction of 3879 amps. During routine melter operation, the control system would be adjusted to deliver less than fill power. When no new feed (glass+waste+water) is being added to the melter, the lid heater power would be off and glass temperature would be maintained by the immersed heaters 20.

In use, the frit is slurried into the containment through nozzle as an electrical potential is applied to primary electrodes. An electrical potential is also applied to lid electrode to heat radiantly the top of the melt as the primary electrodes heated it from within. As the lid electrode tubes over the melt and within the containment produced heat, the newly added frit contributes mass to the melt.

It will be apparent to those skilled in the art that many changes and substitutions can be made to the preferred embodiment herein described without departing from the spirit and scope of the present invention as defined by the appended claims.

What is claimed is:

1. In a melter having a wall with a thickness, said wall defining an interior of said melter, a heater connected to a source of electrical potential, said heater comprising:
- a tube made of a first material, said first material having a first electrical resistivity and a first thermal conductivity, said tube extending across said interior of said melter and through said wall; and
- a core made of a second material and dimensioned to fit within at least one portion of said tube, said second material having a second electrical resistivity and a second thermal conductivity, said core fitted in said tube and extending across said thickness of said wall but not across said interior of said melter,
- said first electrical resistivity being higher than said second electrical resistivity and said first thermal conductivity being lower than said second thermal conductivity,
- said tube conducting electrical current inside said melter when said electrical potential is applied to said heater and said core carrying more electrical current than said tube in said at least one portion of said tube so that more heat is produced inside said melter than in said at least one portion of said tube.

2. The heater as recited in claim 1, wherein said first electrical resistivity is approximately seventeen times greater than said second electrical resistivity.

3. The heater as recited in claim 1, wherein said first thermal conductivity is approximately one fourth of said second thermal conductivity.

4. The heater as recited in claim 1, wherein said first material has a first coefficient of thermal expansion and said second material has a second coefficient of thermal expansion, and wherein said first and said second coefficients are approximately equal.

5. The heater as recited in claim 1, wherein said second material is nickel.

6. A melter for melting particles, comprising:
- a containment having a wall with a thickness, said wall defining an interior of said containment;
- means for feeding said particles into said containment;
- first heating means immersed in said particles within said containment and adapted to melt said particles, said particles forming a melt when melted;
- second heating means located in said containment and above said melt, said second heating means producing resistive heat when connected to a source of electrical potential, and said second heating means further comprise at least one tube made of a first material having a first electrical resistivity and a first thermal conductivity, said tube extending across said interior and through said wall; and at least one core made of a second material having a second electrical resistivity and a second thermal conductivity, said core dimensioned to fit within at least one portion of said tube, said core fitted in said tube and extending across said thickness of said wall but not extending across said interior, said first electrical resistivity being higher than said second electrical resistivity and said first thermal conductivity being lower than said second thermal conductivity, said tube conducting electrical current inside said melter when said electrical potential is applied to said second heating means and said core carrying more electrical current than said tube in said at least one portion of said tube whereby more heat is produced inside said interior than in said at least one portion of said tube.

7. The melter as recited in claim 6, wherein said tube further comprises:
- a plurality of tubes made of said first material, each tube of said plurality of tubes extending across said interior and through said wall;

and said core further comprises:
- a plurality of cores made of said second material and fitting within portions of each tube of said plurality of tubes that lie beyond the interior of said containment;
- means for connecting in series electrically and thermally each of said plurality of tubes.

8. The melter as recited in claim 6, wherein said second electrical resistivity is approximately seventeen times greater than said first electrical resistivity.

9. The melter as recited in claim 6, wherein said first thermal conductivity is approximately four times greater than said second thermal conductivity.

10. The melter as recited in claim 6, wherein said core is made of nickel, said first electrical resistivity being approximately seventeen times greater than said second electrical resistivity, and said first thermal conductivity being approximately one fourth of said second thermal conductivity.

11. The melter as recited in claim 7, wherein said plurality of cores are made of nickel.

12. The melter as recited in claim 7, wherein said second heating means further comprise at least one nickel connector to connect said plurality of cores in series.

13. A melter for melting particles, comprising:
- a containment having a wall with a thickness, said wall defining an interior of said containment;
- means for feeding said particles into said containment;
- first means for heating, said first heating means immersed in said particles within said containment and adapted to melt said particles, said particles forming a melt when melted;
- a plurality of tubes extending across said interior above said melt and through said wall, said plurality of tubes made of a first material having a first electrical resistivity and a first thermal conductivity;
- a plurality of cores dimensioned to fit within said plurality of tubes, said cores fitted in said tubes where said tubes extend across said thickness of said wall but not across said interior, said plurality of cores made of a second material having a second electrical resistivity and a second thermal conductivity,
- said first electrical resistivity being higher than said second electrical resistivity and said first thermal conductivity being lower than said second thermal conductivity;
- means for connecting said plurality of tubes and cores together in series; and
- means for applying an electrical potential to said second heating means whereby said plurality of tubes produce resistive heat, said tubes conducting electrical current inside said interior when said electrical potential is applied to said second heating means and said cores carrying more electrical current than said tubes in said at least one portion of said tubes so that more heat is produced inside said melter than in said at least one portion of said tubes.

14. The melter as recited in claim 13, wherein said second material is nickel and wherein said connecting means is made of nickel.

15. The melter as recited in claim 13, wherein said first electrical resistivity is approximately seventeen times greater than said second electrical resistivity and said second thermal conductivity is approximately four times greater than said first thermal conductivity.

16. The melter as recited in claim 13, wherein said second material is nickel, wherein said first electrical resistivity is approximately seventeen times greater than said second electrical resistivity, and wherein said second thermal conductivity is approximately four times greater than said first thermal conductivity.

* * * * *